Oct. 15, 1935.　　　G. D. ZIMMERMAN　　　2,017,194
TEMPERING AND HEATING SYSTEM
Filed April 27, 1935　　　2 Sheets-Sheet 1

INVENTOR,
George Dewey Zimmerman,
BY Alexander Meucher
ATTORNEY.

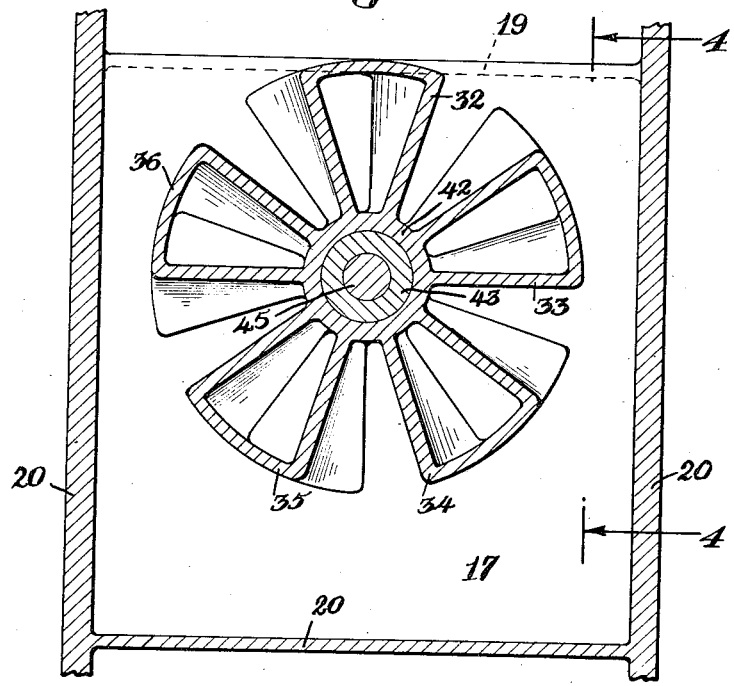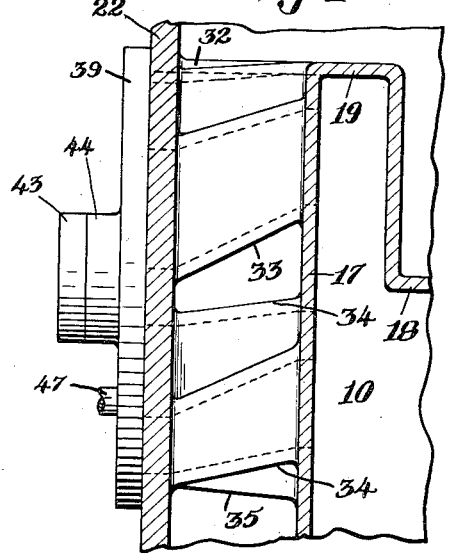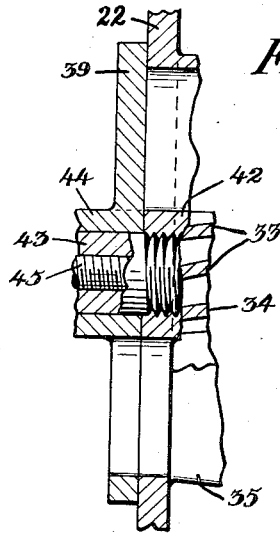

Patented Oct. 15, 1935

2,017,194

UNITED STATES PATENT OFFICE 2,017,194

TEMPERING AND HEATING SYSTEM

George Dewey Zimmerman, New York, N. Y.

Application April 27, 1935, Serial No. 18,677

4 Claims. (Cl. 236—12)

This invention relates generally to a mixing valve and heater whereby a predetermined temperature of the water issuing from the valve is effectuated by utilizing a cold water source and a heating chamber.

The main object of the invention resides in the provision of a mixing valve cooperating with a heating chamber whereby water from a cold water source flows from the mixing valve at a higher and predetermined temperature, and whereby the source of cold water entering the mixing chamber of the valve is automatically and totally cut off when hot water of a predetermined temperature flows out of the said mixing chamber.

A further object of the invention resides in the provision of a mixing valve which is adaptable for cooperation with heaters of types already in use.

A still further object of the invention resides in the provision of a mixing valve and heater whereby economy in cost of operation and construction is attained and whereby simplicity of construction and durability thereof are preserved.

These objects and other incidental ends and advantages of the invention will hereinafter appear in the progress of the disclosure and as pointed out in the appended claims.

Forming part of this specification are drawings showing a preferred form of the invention, corresponding reference characters in the said drawings designating corresponding parts throughout the several views.

In accordance with the drawings:

Figure 3 is a sectional view of Figure 1 through plane 3—3 thereof.

Figure 4 is a sectional view of Figure 3 through the plane 4—4 thereof, including the showing of a mounted rotatable disc in elevation.

Figure 5 is a view in elevation of the forward portion of Figure 4 along the vertical diameter thereof.

Figures 1, 2:
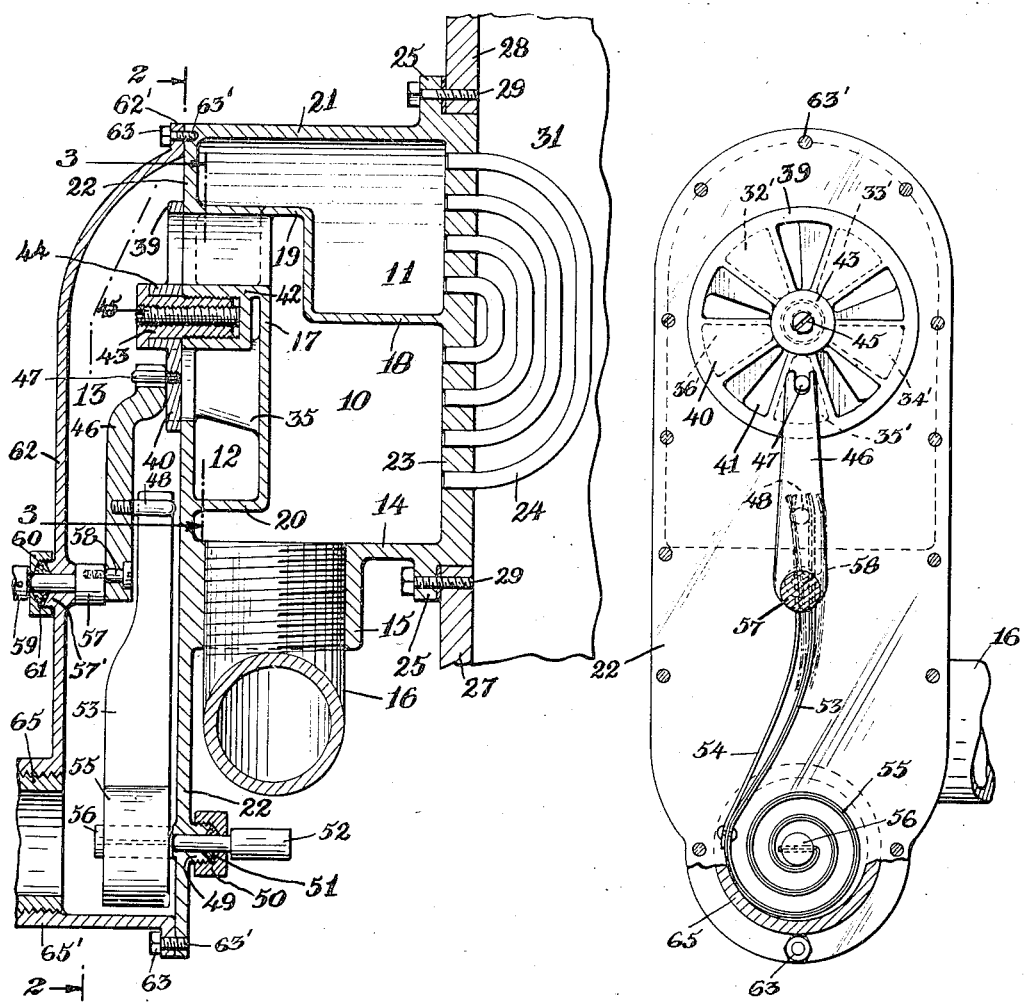
Figure 1 is a view in section showing the several chambers of the mixing valve, a portion of the heating chamber and controlling elements.
Figure 2 is a sectional view of Figure 1 through the plane 2—2 thereof.

In accordance with the invention and in accordance with a preferred form thereof shown in the above described figures, numerals 10, 11, 12 and 13 designate the chambers of the mixing valve, while numeral 31 designates a heating chamber whereby cold water from chamber 10 flows therethrough by means of pipes 24 and enters chamber 11 already heated. The water so heated flows from chamber 11 into the communicating chamber 12. Disposed across the communicating chamber 12 are a plurality of radially disposed conduits 32, 33, 34, 35 and 36 whereby cold water from chamber 10 is directly fed into chamber 13, the openings of the said conduits coinciding with openings in the front and rear walls 22 and 17 of chamber 12. Front wall of chamber 12 is further provided with another series of openings 32', 33', 34', 35' and 36' intermediate the front openings of the above mentioned conduits to permit the flow of hot water from chamber 12 into chamber 13. A rotatable disc member 39, however, controls the amount of flow of both the cold water through the said conduits and the flow of the hot water through the openings 32'—36' into chamber 13, the latter being best described as a mixing chamber.

The position of disc member 39, rotating about the front face of wall 22, determines the temperature of the resultant mixture of hot and cold water in chamber 13. The position of the said disc member 39 is automatically controlled by a thermal element 53 which is in the line of flow of the mixture of the hot and cold water in chamber 13. Means are provided for the regulation and setting of both the thermal element and its associated parts.

The general construction and mode of operation of the preferred form of the invention having above been described, details of construction and mode of operation shall now be set forth.

The valve proper comprises a main casing into which is fed a source of water of a constant or variable temperature, the rear of the said main casing being penetrated by tubing extending from a heating chamber, the said tubing constituting communicating conduits between the cold and the hot water chambers within the said main casing. The main casing is divided into three chambers, a cold water chamber 10, the latter having a pipe 16 carrying cold water of constant or variable temperature thereinto, a hot water chamber 11 superposing the said cold chamber 10 and separated therefrom by a partition 18 and 19. The third chamber 12 of the main casing extends below the hot water chamber 11 and is in communication therewith by virtue of an open top. Numeral 21 represents the top and sidewalls of the main casing and forms the limiting sidewalls of the cold water chamber 10, hot water chamber 11 and the third chamber 12. Numeral 14 designates the bottom wall of the main casing, serving as the lower limiting wall of cold water chamber 10 at the same time. Numeral 23 designates the rear wall of the main casing and serves also as the rear walls for cold water chamber 10 and hot water chamber 11. Cold water chamber 10 and hot water chamber 11 communicate with each other by means of tubing 24 projecting from a heating chamber 31, the said tubing 24 penetrating the rear wall of the main casing in both the cold water chamber 10 and the hot water chamber 11. The intermediate chamber 12 is positioned forwardly of cold water chamber 10 and is provided with a rear wall 17 and a bottom wall 20. The main casing is provided with a front wall 22 which projects beyond the lower limiting wall 14 of the said main casing and serves to form a closure for cold water chamber 10, hot water chamber 11 and third chamber 12. Third chamber 12 is provided with a hub 42 projecting forwardly of the rear wall 17 thereof and penetrating the front wall 22 of the main casing. Radially disposed about the said hub 42 and traversing the depth of the third chamber 12 are a series of spaced conduits 32, 33, 34, 35, and 36 which open into cold water chamber 10 at the rear ends thereof through rear wall 17 and which open into a mixing chamber 13 exterior to the main casing at the front ends thereby penetrating front wall 22 of the main casing. The front and rear openings of conduits 32-36 inclusive are preferably offset to attain a turbulence of the waters flowing from cold water chamber 10 into mixing chamber 13. The mixing chamber 13 is comprised of rear wall 22, which serves as the front wall of the main casing, an elongated and curved front wall 62 terminating at the bottom thereof and along the vertical axis in a boss 64, which serves as the front and side walls of the said mixing chamber and also as the bottom wall 65'. The said front wall 62 is affixed to the front wall 22 of the main casing by means of an edge flange 62' and screws 63'. The main casing is affixed to the heating chamber by means of a flange 25 extending around the main casing proximate to the rear wall 23 and abutting the edges 27 and 28 of the heating chamber 13 above the opening in which rear wall 23 of the main casing fits, the said flange being secured thereto by means of screws 29.

The bottom wall 14 of the main casing is provided with a central boss 15 into which extends an inlet pipe 16 furnishing chamber 10 with a fluid of constant or variable temperature desired to be tempered to a higher temperature, while boss 64 in the front wall 62 of the mixing chamber is provided with an outlet pipe 65 from which flows the tempered fluid.

Front wall 22 in the upper part thereof is provided with a series of apertures radially disposed leading into auxiliary chamber 12, the said apertures being spaced between conduits 32-36 inclusive and being designated by numerals 32', 33', 34', 35' and 36'.

Hub 42 in the auxiliary chamber 12 provides the mounting means for a rotatable disc plate 39, the said disc plate being provided with a series of radially disposed apertures designated by numeral 41 and alternate solid uncut portions 40. The rotatable disc plate can thus either completely close the front openings of conduits 32-36 by means of uncut portions 40 and at the same time have apertures 41 thereof align with apertures 32'-36' of the front wall 22 of the main casing. Thus the position of disc plate 39 determines the amount of flow into the mixing chamber from auxiliary chamber 12 and cold fluid chamber 10, the disc plate 39 being capable of closing off completely or partially the flow from either chamber 12 or 10.

Disc plate 39 is automatically shifted rotatably by means of any bimetallic element inserted in the line of flow of the mixed or tempered fluids in the mixing chamber 13, or if desirable, the means of shifting disc plate 39 may comprise a mechanism relying on a liquid having a high coefficient of expansion. As shown on the drawings, however, bimetallic element 53 is provided with a mounting spindle 56 which is in turn provided with a bearing spindle and control knob 52. At the lower portion of wall 22 and along the central vertical axis, preferably, an orifice is provided with a boss 49 on the outer surface of the said wall, the said orifice and boss being penetrated by the bearing spindle of mounting spindle 56. Boss 49 is threaded and is provided with packing 51 and an engaging cap 50. The bimetallic element 53 is customarily in the form of a coil as represented by numeral 55 at the lower part and is wound on the mounting spindle 56. Numeral 54 designates a spring element riveted to the band portion of the bimetallic element 53 and extends upwardly together with the said element to constitute a gripping means for disc plate 39. Protruding from a solid uncut portion of disc plate 39 forwardly and below the center of the said disc plate is a pin 47 which is actuated by an arm 46, the said arm engaging pin 47 in the upper portion thereof by means of a U-shaped slot. Arm 46 is rotatably mounted on a spindle 58 located at the lower part of the said arm, the said spindle being eccentrically affixed to a disc 57 within the mixing chamber 13. Disc 57 is controlled by a knob 59 situated on the outer surface of the front wall 62 of the mixing chamber 13, the said knob 59 extending inwardly through front wall 62 by means of a shank connected to disc 57. A boss 57' is provided in front plate 62 around the orifice for the shank of knob 59, the said boss 57' being threaded on the outer part to engage a cap 60 with packing therein 61.

Arm 46 at the rear surface thereof and below the center of the central vertical axis is provided with a protruding pin 48 which is engaged on both sides thereof by thermal element 53 and spring element 54 at the top portions thereof.

Thus, bimetallic element 53 in conjunction with spring element 54 exerts a lateral pressure on either side of engaging pin 47 by causing arm 46 to rotate about pin 48 thereby causing disc plate 39 to effect the flow of fluids from both conduits 32—36 and apertures 32'—36'. The pressure exerted by the differential expansion element 53 is a function of the temperature of the mixed fluids in the mixing chamber and causes disc plate 39 to move either clock-wise or counter-clockwise in degrees dependent upon the change of temperature. Arm 46 is regulable for any predetermined temperature in the mixing chamber by means of knobs 51 and 52.

Disc plate 39 is mounted for easy rotation on a bearing 44. The interior of hub 42 in auxiliary chamber 12 is internally threaded and engages a plug member 43 having an expanded outer head and a smooth shank portion which engages bearing 44. Plug member 43 is internally threaded throughout its length to engage a screw 45, the said screw being capable of penetrating the rear wall of the interior of hub 42 thereby serving as a locking means for plug 43. It is of course understood that any other mounting means for disc plate 39 is feasible in conjunction with hub 42.

The operation of the structure described is simple. Water of any constant or variable temperature which is desired to be tempered to a higher and fixed temperature flows into chamber 10 through inlet pipe 16. If disc plate 39 is in a position whereby conduits 32—36 are closed to an extent whereby water is forced through piping 24, the said water becomes heated by reason of the applied heat in chamber 31. The heat applied may be in the form of hot exhaust gases, a hot water boiler surrounding coils of piping 24, furnace heat or electrical heat. The water so heated in piping 24 passes into chamber 11 and then into auxiliary chamber 12. The heated water in auxiliary chamber 12 penetrates apertures 32'—36' in wall 22. The amount of hot water and the amount of cold water flowing into the mixing chamber 13 depends on the position of disc plate 39 which latter in turn depends on the effect given to bimetallic element 53 by the temperature of the mixture in chamber 13. Although water has been described as the fluid used, any other fluid is feasible.

Thus a system has been provided wherein a source of heat of varying temperature is utilized to raise the temperature of a fluid to a predetermined temperature held within reasonable minimum and maximum limits even though the quantity of the fluid to be raised in temperature varies widely during operation. The adjustment of the structure in the system permits a wide range of operation by revolving the thermostatic or bimetallic element 53 on its spindle or axis 56 outside of the casing, and by adjusting the position of disc plate 39 to close limits by the action of the eccentrically mounted arm 46 between the bimetallic element 53 and disc plate 39 by knob 59 outside the casing.

I wish it understood that minor changes and variations in the construction of the several parts of the structure described and the several combinations and subcombinations may all be resorted to without departing from the scope of the invention and without departing from the meaning of the several claims.

I claim:

1. In a tempering system, a heating chamber, a main casing having a relatively cold and hot fluid chamber, an inlet extending into the relatively cold fluid chamber carrying the source of the relatively cold fluid content, piping means projecting from the heating chamber and forming the communicating means between the relatively cold and hot fluid chambers, an auxiliary chamber in communication with the relatively hot fluid chamber and disposed within the said cold fluid chamber, a mixing chamber cooperating with the main casing having an outlet projecting therefrom from which the mixed fluids issue at a regulated temperature, a plurality of conduits connecting the auxiliary and relatively cold fluid chambers, a plurality of apertures extending into the mixing chamber from the auxiliary chamber whereby the contents thereof flow into the said mixing chamber, a valve plate provided with apertures whereby the fluid element of the auxiliary chamber and of the relatively cold water chamber are regulable as to flow into the mixing chamber, automatic means of regulating the said valve plate within the mixing chamber.

2. In a tempering system, a main casing having a relatively cold and hot fluid chamber and an auxiliary chamber communicating with the said hot fluid chamber, a heating chamber having piping means projecting therefrom and forming the communicating means between the cold and hot water chambers, a plurality of conduits radially disposed within the auxiliary chamber, a mixing chamber cooperating with the main casing and being connected by the said conduits with the cold water chamber, a plurality of apertures extending into the mixing chamber from the auxiliary chamber, a rotatable valve plate controlling the flow into the mixing chamber of the auxiliary and cold water chambers, automatic means of regulating the said valve plate within the mixing chamber.

3. In a tempering system, a main casing having a relatively cold and hot fluid chamber and an auxiliary chamber communicating with the said hot fluid chamber, the said cold fluid chamber being provided with an inlet thereto from a source of relatively cold fluid desired to be tempered to a higher temperature, a heating chamber having piping means projecting therefrom and forming the communicating means between the relatively cold and hot fluid chambers, a plurality of conduits radially disposed within the auxiliary chamber, a mixing chamber cooperating with the main casing and being connected by the said conduits with the cold water chamber, the said mixing chamber being provided with an outlet for the outflow of the fluids tempered to a predetermined temperature, the said auxiliary chamber being provided with a plurality of apertures extending into the mixing chamber, a rotatable valve plate controlling the flow into the mixing chamber of the contents of the auxiliary and cold fluid chambers, means of controlling the position of the said valve plate positioned in the mixing chamber and actuated by the resultant temperature therein.

4. In a tempering system, a main casing having a relatively cold and hot fluid chamber and an auxiliary chamber communicating with the said hot fluid chamber, the said cold fluid chamber being provided with an inlet thereto from a source of relatively cold fluid desired to be tempered to a higher temperature, a heating chamber having piping means therein and forming the communicating means between the relatively cold and hot fluid chambers, the fluid passing from the cold water chamber being heated in the heating chamber, a plurality of conduits radially disposed within the auxiliary chamber, a mixing chamber cooperating with the main casing and being connected by the conduits with the cold water chamber, the mixing chamber being provided with an outlet, the auxiliary chamber being provided with a plurality of apertures, automatic means to control the flow of the contents from the cold and auxiliary chambers into the mixing chamber.

GEORGE DEWEY ZIMMERMAN.